United States Patent
Sakurai

(10) Patent No.: US 7,030,172 B2
(45) Date of Patent: Apr. 18, 2006

(54) ELECTROMAGNETIC WAVE ABSORBING COMPOSITIONS

(75) Inventor: Ikuo Sakurai, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 137 days.

(21) Appl. No.: 10/443,806

(22) Filed: May 23, 2003

(65) Prior Publication Data

US 2003/0219598 A1 Nov. 27, 2003

(30) Foreign Application Priority Data

May 23, 2002 (JP) .............................. 2002-149341

(51) Int. Cl.
*G21F 1/10* (2006.01)

(52) U.S. Cl. ...................... 523/137; 523/136; 523/205; 523/209; 523/212; 523/216

(58) Field of Classification Search ........ 523/136–137, 523/205, 209, 212, 216

See application file for complete search history.

(56) References Cited

U.S. PATENT DOCUMENTS

| | | | | |
|---|---|---|---|---|
| 4,990,556 A | * | 2/1991 | Shimizu et al. | 524/475 |
| 5,688,852 A | * | 11/1997 | Misawa et al. | 524/431 |
| 5,693,690 A | * | 12/1997 | Hayashi et al. | 523/216 |
| 6,310,118 B1 | * | 10/2001 | Atarashi et al. | 523/205 |
| 6,652,958 B1 | * | 11/2003 | Tobita | 428/298.1 |
| 6,695,985 B1 | * | 2/2004 | Igarashi et al. | 252/518.1 |
| 6,737,451 B1 | * | 5/2004 | Carlberg et al. | 523/216 |
| 6,800,804 B1 | * | 10/2004 | Igarashi et al. | 174/35 MS |
| 2002/0039667 A1 | * | 4/2002 | Takaya et al. | 428/692 |

FOREIGN PATENT DOCUMENTS

| | | |
|---|---|---|
| JP | 11-45804 A | 2/1999 |
| JP | 2001-308584 A | 11/2001 |
| JP | 2003347787 | * 12/2003 |

* cited by examiner

*Primary Examiner*—Peter Szekely
(74) *Attorney, Agent, or Firm*—Birch, Stewart, Kolasch & Birch, LLP

(57) ABSTRACT

An electromagnetic wave-absorbing composition is obtained by dispersing in a base polymer a magnetic powder coated with electrically insulating inorganic fines and optionally, a heat conductive powder. The composition has a high breakdown voltage, and can be applied to any adequate site within electronic equipment without a need to pay substantial attention to short-circuits.

14 Claims, 1 Drawing Sheet

ELECTROMAGNETIC WAVE ABSORBING COMPOSITIONS

FIELD OF THE INVENTION

This invention relates to electromagnetic wave-absorbing compositions having a good electromagnetic wave absorbing ability and a high breakdown voltage.

BACKGROUND ART

With the ever-increasing utilization of electromagnetic waves in broadcasting, mobile communication, radar, cellular phones, wireless local area networks (LAN) and other systems, more electromagnetic waves are scattering in the ambient atmosphere. This situation frequently gives rise to the problems of electromagnetic wave disturbance and electronic equipment malfunction.

With the advance toward a higher density and higher integration of central processor units (CPU), micro processor units (MPU), large scale integrated circuits (LSI) other components used in electronic equipment such as personal computers and mobile phones as well as higher density mounting of electronic components on printed circuit boards, there arise problems that electromagnetic waves are radiated in the interior of equipment and reflected thereby so that the interior is full of electromagnetic waves. Electromagnetic interference can occur with the electromagnetic wave emitted by the equipment itself.

In the prior art, an artisan with specialized knowledge and experience of noise suppression must be engaged in taking a countermeasure against disturbances by electromagnetic interference. It is a time-consuming task to find an effective countermeasure. Another drawback is that a guarded component requires an extra space for mounting. To solve these problems, engineers are interested in electromagnetic absorbers which absorb electromagnetic waves for thereby reducing reflected and transmitted waves.

The drive toward higher density and higher integration of electronic equipment components such as CPU, MPU and LSI entails increased amounts of heat release. Ineffective cooling will allow thermal runaway, causing malfunction. One typical means for effectively radiating heat to the exterior is to place silicone grease or silicone rubber filled with heat conductive powder between electronic components (e.g., CPU, MPU and LSI) and heat sinks to reduce contact thermal resistance. This means, however, cannot avoid the problem of electromagnetic interference within the equipment interior.

Therefore, members having electromagnetic wave absorbing and heat transfer abilities are needed for high density and highly integrated components (e.g., CPU, MPU and LSI) within electronic equipment. Depending on the necessary situation, the state-of-the-art makes a choice among three types: (1) sheets of a base polymer with a magnetic powder dispersed therein having only an electromagnetic wave absorbing ability, (2) sheets of a base polymer with a heat conductive powder (like alumina) dispersed therein having only a heat transfer ability, and (3) sheets filled with both the powders having both electromagnetic wave absorbing and heat transfer abilities.

In these years, the signal processing speed of personal computers and other electronic equipment is drastically increasing. Many devices have an operating frequency of several hundred MHz to several GHz. Then electromagnetic noises generating in electronic equipment often have frequencies in the GHz band. To suppress such electromagnetic noises, the use of sheets having a spinel type cubic ferrite powder (typically manganese zinc base ferrite or nickel zinc base ferrite) uniformly dispersed in a base polymer may be useful. These ferrite sheets are effective mainly in the MHz band, but less in the GHz band. Then, sheets having uniformly dispersed in a base polymer a metal base soft magnetic powder which is more effective in the GHz band become the mainstream shield used at present.

Since soft magnetic metals are generally electrically conductive, sheets having such powder dispersed in a base polymer have a low breakdown voltage. Then, when a sheet is mounted within an electronic equipment, care must be taken so as to avoid short-circuits between individual parts with which the sheet can come in contact.

On use, the sheet having both electromagnetic wave absorbing and heat transfer abilities is often sandwiched between a device and a heat sink. The sheet cannot be used if electrical connection between a device and a heat sink is a problem. In this situation, an electrically insulating sheet having only a heat transfer ability is sandwiched between a device and a heat sink for dissipating the heat from the device. At the same time, a sheet having only an electromagnetic wave absorbing ability is placed at a nearby area where no electrical problem occurs, for suppressing electromagnetic noise. The use of two types of sheet is cumbersome.

Most of electromagnetic noise-generating sites within electronic equipment are high speed operating devices such as CPU, MPU and LSI, whereas pins or legs for connecting the device to the pattern of a printed circuit board and the printed circuit pattern itself can act as antennas to generate electromagnetic noises. In the latter case, it is preferred that an electromagnetic wave-absorbing material be directly mounted at the noise generating site. However, a material having uniformly dispersed in a base polymer a metal base soft magnetic powder which is fully effective to noise in the GHz band cannot be used because it causes short-circuits.

Basically, in the material having a metal base soft magnetic powder uniformly dispersed in a base polymer, the electroconductive soft magnetic metal particles are electrically insulated from each other since the base polymer is electrically insulating. To enhance the electromagnetic wave absorbing ability, the material must be heavily loaded with soft magnetic metal powder. As a consequence, metal particles are spaced only a close distance and can even be brought into contact, resulting in the composition having a lower breakdown voltage. JP-A 11-45804 describes an electromagnetic wave-absorbing material in which a soft magnetic metal powder is covered on the surface with an insulating coating of a silane coupling agent. JP-A 2001-308584 describes an electromagnetic wave-absorbing material in which a soft magnetic metal powder is covered on the surface with an insulating coating of a long-chain alkyl silane. The coatings of molecules having such organic radicals are difficult to provide an electromagnetic wave-absorbing composition with a satisfactory breakdown voltage.

SUMMARY OF THE INVENTION

Therefore, an object of the present invention is to provide an electromagnetic wave-absorbing composition having an enhanced electromagnetic wave-absorbing ability and a satisfactory breakdown voltage.

Another object of the present invention is to provide an electromagnetic wave-absorbing composition having both enhanced electromagnetic wave-absorbing and heat transfer abilities as well as a satisfactory breakdown voltage.

It has been found that when magnetic powder particles coated with electrically insulating inorganic fines are dispersed in a base polymer, there is obtained an electromagnetic wave-absorbing composition having an enhanced electromagnetic wave-absorbing ability and a satisfactory breakdown voltage. It has also been found that by adding a heat conductive powder to the above composition, the electromagnetic wave-absorbing composition is endowed with both enhanced electromagnetic wave-absorbing and heat transfer abilities as well as a satisfactory breakdown voltage.

In a first aspect, the invention provides an electromagnetic wave-absorbing composition in which a magnetic powder coated with electrically insulating inorganic fines is dispersed in a base polymer.

In a second aspect, the invention provides an electromagnetic wave-absorbing composition in which a magnetic powder coated with electrically insulating inorganic fines and a heat conductive powder are dispersed in a base polymer.

DESCRIPTION OF THE PREFERRED EMBODIMENTS

Figure 1:
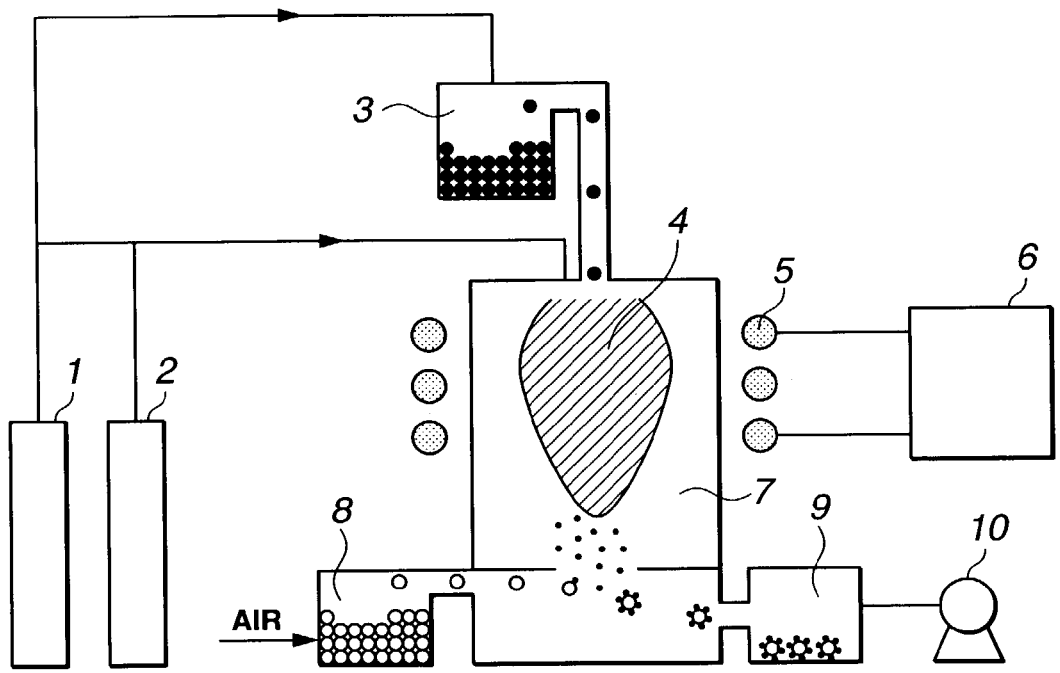
FIG. 1 schematically illustrates an RF thermal plasma method.

The electromagnetic wave-absorbing composition of the invention is arrived at by uniformly dispersing a magnetic powder coated with electrically insulating inorganic fines and optionally, a heat conductive powder in a base polymer.

The magnetic powder with which the electromagnetic wave-absorbing composition is filled is not critical as long as it can absorb electromagnetic waves. Among others, soft magnetic metal materials are useful. Since soft magnetic metal materials are electrically conductive, a coating of electrically insulating inorganic fines thereon is effective for significantly improving the breakdown voltage of the composition.

From the standpoints of constant supply and cost, metal materials containing iron element are preferred as the soft magnetic metal powder. Examples include carbonyl iron, electrolytic iron, Fe—Cr base alloys, Fe—Si base alloys, Fe—Ni base alloys, Fe—Al base alloys, Fe—Co base alloys, Fe—Al—Si base alloys, Fe—Cr—Si base alloys, and Fe—Si—Ni base alloys, but are not limited thereto. Those metal materials containing at least 15% by weight of iron element are preferred from the economical standpoint.

The magnetic powder may be used alone or as a combination of two or more. The powder particles may be either tabular or granular in shape or both.

Preferably the magnetic powder (particles) has an average particle size of 0.1 to 100 μm, more preferably 1 to 50 μm. Particles with an average particle size of less than 0.1 μm have too large a specific surface area, which may prohibit heavy loading. If particles have an average particle size of more than 100 μm, they may develop minute asperities on the surface of the cured electromagnetic wave-absorbing composition, to increase the contact thermal resistance, which is undesirable when heat transfer is required.

The magnetic powder particles are coated with electrically insulating inorganic fines, which are selected from oxides such as alumina, silica, titanium oxide and ferrite, nitrides such as silicon nitride, boron nitride and aluminum nitride, and carbides such as silicon carbide, but not limited thereto. The magnetic powder coated with electrically insulating inorganic fines is sometimes referred to as "coated magnetic powder."

The coating weight (or buildup) of electrically insulating inorganic fines on the magnetic powder is preferably 0.5 to 20 parts by weight, more preferably 1 to 10 parts by weight per 100 parts by weight of the magnetic powder.

Any desired method may be employed in coating the magnetic powder particles with electrically insulating inorganic fines. For instance, an RF thermal plasma method is useful. Another method involves the steps of dispersing submicron fines of alumina or the like in an organic solvent such as alcohol to form a dispersion, immersing magnetic powder particles in the dispersion, uniformly agitating the dispersion, and evaporating off the organic solvent, whereby the magnetic powder particles having submicron fines borne thereon are left behind.

Since electrically insulating inorganic fines have a strong cohesion force to magnetic particles, the radio frequency (RF) thermal plasma method is advantageously used. Referring to FIG. 1, the RF thermal plasma method is described. A mixture of argon gas and hydrogen gas from an argon gas source 1 and a hydrogen gas source 2 is fed into a chamber 7. Art RF power supply 6 conducts an RF current at a frequency of 0.5 to 40 MHz, typically 4 MHz to a copper coil 5 wrapped around the chamber 7 for generating an RF thermal plasma arc 4 within the chamber 7. To the RF thermal plasma arc 4, electrically insulating inorganic fines to become an inorganic insulating coating are fed from its source 3 using argon gas as a carrier gas. Then the electrically insulating inorganic fines are once gasified in the plasma and then agglomerate and deposit on surfaces of magnetic particles which are pneumatically fed from a magnetic powder source 8. The magnetic particles coated with the electrically insulating inorganic fines are recovered in a reservoir 9 under suction of a vacuum pump 10.

In the electromagnetic wave-absorbing composition, the magnetic powder coated with electrically insulating inorganic fines is preferably contained in an amount of 5 to 80% by volume, more preferably 20 to 70% by volume of the entire composition. Less than 5 vol % of the coated magnetic powder may fail to achieve a satisfactory electromagnetic wave absorbing ability whereas loading of more than 80 vol % of the coated magnetic powder may render the composition brittle.

When the electromagnetic wave-absorbing composition is used at a site where heat transfer is required, it is recommended to further incorporate a heat conductive powder in the composition in addition to the coated magnetic powder, for endowing the composition with an enhanced heat transfer ability.

The heat conductive powder is selected from metals such as copper and aluminum, metal oxides such as alumina, silica, magnesia, red iron oxide, beryllia, and titania, metal nitrides such as aluminum nitride, silicon nitride and boron nitride, and silicon carbide, but not limited thereto. Of these, electrically non-conductive ones are preferred.

Preferably the heat conductive powder (particles) has an average particle size of 0.1 to 100 μm, more preferably 1 to 50 μm. Particles with an average particle size of less than 0.1 μm have too large a specific surface area, which may prohibit heavy loading. If particles have an average particle size of more than 100 μm, they may develop minute asperities on the surface of the cured electromagnetic wave-absorbing composition, to increase the contact thermal resistance, which is undesirable when heat transfer is required.

The heat conductive powder is used herein for achieving closest packing with the coated magnetic powder and for increasing a thermal conductivity. In the electromagnetic wave-absorbing composition, the amount of the heat conductive powder loaded is preferably 5 to 80% by volume of the entire composition. Additionally, the amount of the heat conductive powder and the coated magnetic powder combined is preferably 10 to 90% by volume, especially 30 to 80% by volume of the entire composition. If the amount of the heat conductive powder and the coated magnetic powder combined is less than 10 vol %, the composition may not have a satisfactory thermal conductivity. If the same amount is more than 90 vol %, the composition may become brittle. In the embodiment having the heat conductive powder compounded, a sheet formed of the electromagnetic wave-absorbing composition should preferably have a thermal conductivity of at least 1 W/mK, especially at least 2 W/mK.

In the electromagnetic wave-absorbing composition of the invention, the base polymer may be a thermosetting resin, thermoplastic resin, rubber or the like, but is not limited thereto. A suitable base polymer for the intended application may be selected from such materials.

Illustrative examples of the base polymer include organopolysiloxane, acrylic resins, chlorinated polyethylene, polyethylene, polypropylene, ethylene-propylene copolymers, polyvinyl chloride, fluoro rubber, and urethane resins.

In the application where heat transfer is required, in order to reduce the contact thermal resistance between the electromagnetic wave-absorbing composition and a heat generating object and/or a heat sink, the electromagnetic wave-absorbing composition of the invention should preferably be flexible enough to conform to minute asperities on the surface of the member. In this event, it is preferred to use as the base polymer an organopolysiloxane which is easy to adjust the hardness of the electromagnetic wave-absorbing composition and heat resistant. Suitable compositions using an organopolysiloxane as the base polymer include, but are not limited to, unvulcanized patty silicone resin compositions, silicone gel compositions comprising a curable organopolysiloxane as the base polymer, silicone rubber compositions of the addition reaction type, and silicone rubber compositions of the peroxide crosslinking type.

It is noted that the composition comprising a curable organopolysiloxane as the base polymer, in the cured state, preferably has a rubber hardness of up to 80, especially up to 70 in Asker C hardness.

In the unvulcanized patty silicone, silicone rubber, and silicone gel compositions described above, the base polymer may be any well-known organopolysiloxane. Typically the organopolysiloxane used herein has the average compositional formula (1) below.

  (1)

In formula (1), $R^1$, which may be the same or different, stands for substituted or unsubstituted monovalent hydrocarbon radicals, preferably having 1 to 10 carbon atoms, more preferably 1 to 8 carbon atoms, for example, unsubstituted monovalent hydrocarbon radicals including alkyl radicals such as methyl, ethyl, isopropyl, butyl, isobutyl, tert-butyl, hexyl and octyl; cycloalkyl radicals such as cyclohexyl; alkenyl radicals such as vinyl and allyl; aryl radicals such as phenyl and tolyl; aralkyl radicals such as benzyl, phenylethyl and phenylpropyl; and substituted monovalent hydrocarbon radicals including the foregoing radicals in which some or all of the hydrogen atoms attached to carbon atoms are substituted with halogen atoms, cyano and other radicals, for example, halogenated alkyl radicals and cyano-substituted alkyl radicals such as chloromethyl, bromoethyl and cyanoethyl. Of these, methyl, phenyl, vinyl and trifluoropropyl radicals are preferable. More preferably methyl accounts for at least 50 mol %, especially at least 80 mol % of the $R^1$ radicals. The subscript "a" is a positive number from 1.98 to 2.02. Preferably the organopolysiloxane has at least two alkenyl radicals per molecule, especially with the alkenyl radicals accounting for 0.001 to 5 mol % of the $R^1$ radicals.

The organopolysiloxane of formula (1) may have any molecular structure and is preferably blocked at ends of its molecular chain with triorganosilyl radicals or the like, especially diorganovinylsilyl radicals such as dimethylvinylsilyl. In most cases, the organopolysiloxane is preferably a linear one. A mixture of two or more different molecular structures is acceptable.

The organopolysiloxane preferably has an average degree of polymerization of about 100 to 100,000, especially about 100 to 2,000, and a viscosity of about 100 to 100,000,000 centistokes at 25° C., especially about 100 to 100,000 centistokes at 25° C.

When the above silicone rubber composition is formulated to the addition reaction curing type, the organopolysiloxane is one having at least two alkenyl radicals such as vinyl radicals per molecule, and the curing agent is a combination of an organohydrogenpolysiloxane and an addition reaction catalyst.

The organohydrogenpolysiloxane is preferably of the following average compositional formula (2):

  (2)

wherein $R^2$ is a substituted or unsubstituted monovalent hydrocarbon radical of 1 to 10 carbon atoms, the subscript "b" is a number from 0 to 3, especially from 0.7 to 2.1, and "c" is a number from more than 0 to 3, especially from 0.001 to 1, satisfying 0<b+c≦3, especially 0.8≦b+c≦3.0. This organohydrogenpolysiloxane is liquid at room temperature.

In formula (2), $R^2$ stands for substituted or unsubstituted monovalent hydrocarbon radicals of 1 to 10 carbon atoms, especially 1 to 8 carbon atoms, examples of which are the same as exemplified above for $R^1$, preferably those free of aliphatic unsaturation, and include alkyl, aryl, aralkyl and substituted alkyl radicals, such as methyl, ethyl, propyl, phenyl, and 3,3,3-trifluoropropyl among others. The molecular structure may be straight, branched, cyclic or three-dimensional network. The silicon atom-bonded hydrogen atoms (i.e., SiH radicals) may be positioned at ends or midway of the molecular chain or both. The molecular weight is not critical although the viscosity is preferably in the range of 1 to 1,000 centistokes at 25° C., especially 3 to 500 centistokes at 25° C.

Illustrative, non-limiting, examples of the organohydrogenpolysiloxane include 1,1,3,3-tetramethyldisiloxane, methylhydrogen cyclic polysiloxane, methylhydrogensiloxane/dimethylsiloxane cyclic copolymers, both end trimethylsiloxy-blocked methylhydrogenpolysiloxane, both end trimethylsiloxy-blocked dimethylsiloxane/methylhydrogensiloxane copolymers, both end dimethylhydrogensiloxy-blocked dimethylpolysiloxane, both end dimethylhydrogensiloxy-blocked dimethylsiloxane/methylhydrogensiloxane copolymers, both end trimethylsiloxy-blocked methylhydrogensiloxane/diphenylsiloxane copolymers, both end trimethylsiloxy-blocked methylhydrogensiloxane/diphenylsiloxane/dimethylsiloxane copolymers, copolymers comprising $(CH_3)_2HSiO_{1/2}$ units and $SiO_{4/2}$ units, copolymers comprising $(CH_3)_2HSiO_{1/2}$ units, $(CH_3)_3SiO_{1/2}$ units and $SiO_{4/2}$ units, and copolymers comprising $(CH_3)_2HSiO_{1/2}$ units, $SiO_{4/2}$ units and $(C_6H_5)_3SiO_{1/2}$ units.

The organohydrogenpolysiloxane is preferably blended in the base polymer in such amounts that the ratio of the number of silicon atom-bonded hydrogen atoms (i.e., SiH radicals) on the organohydrogenpolysiloxane to the number of silicon atom-bonded alkenyl radicals on the base polymer may range from 0.1:1 to 3:1, more preferably from 0.2:1 to 2:1.

The addition reaction catalyst used herein is typically a platinum group metal catalyst. Use may be made of platinum group metals in elemental form, and compounds and complexes containing platinum group metals as the catalytic metal. Illustrative examples include platinum catalysts such as platinum black, platinic chloride, chloroplatinic acid, reaction products of chloroplatinic acid with monohydric alcohols, complexes of chloroplatinic acid with olefins, and platinum bisacetoacetate; palladium catalysts such as tetrakis(triphenylphosphine)palladium and dichlorobis(triphenylphosphine)palladium; and rhodium catalysts such as chlorotris(triphenylphosphine)rhodium and tetrakis(triphenylphosphine)rhodium. The addition reaction catalyst may be used in a catalytic amount, which is often about 0.1 to 1,000 ppm, more preferably about 1 to 200 ppm of platinum group metal, based on the weight of the alkenyl radical-containing organopolysiloxane. Less than 0.1 ppm of the catalyst may be insufficient for the composition to cure whereas more than 1,000 ppm of the catalyst is often uneconomical.

In the other embodiment wherein the silicone rubber composition is of the peroxide curing type, organic peroxides are used as the curing agent. The organic peroxide curing is useful when the organopolysiloxane as the base polymer is a gum having a degree of polymerization of at least 3,000. The organic peroxides used may be conventional well-known ones, for example, benzoyl peroxide, 2,4-dichlorobenzoyl peroxide, p-methylbenzoyl peroxide, o-methylbenzoyl peroxide, 2,4-dicumyl peroxide, 2,5-dimethylbis(2,5-t-butylperoxy)hexane, di-t-butyl peroxide, t-butyl perbenzoate, 1,1-bis(t-butylperoxy)-3,3,5-trimethylcyclohexane, and 1,6-bis(t-butylperoxycarboxy)hexane. An appropriate amount of the organic peroxide blended is about 0.01 to 10 parts by weight per 100 parts by weight of the organopolysiloxane as the base polymer.

In addition to the above components, the electromagnetic wave-absorbing composition of the invention may further include well-known components.

Also a wetter is preferably used for the purpose of improving the wetting (or dispersibility) of the coated magnetic powder and heat conductive powder with the base polymer for thereby increasing the amount of the powders loaded. Suitable wetter include silanes and low molecular weight siloxanes having hydrolyzable radicals such as hydroxyl and alkoxy radicals which are usually incorporated in conventional silicone rubber compositions, with a hydrolyzable radical-containing methylpolysiloxane having trifunctionality at one end being especially preferred.

Any desired conventional methods may be employed in producing, molding and curing the electromagnetic wave-absorbing composition of the invention.

The shape of the electromagnetic wave-absorbing composition of the invention is not critical. The composition may take the form of a sheet, a molded part of arbitrary shape, a variable shape material, or a material which has a variable shape upon application and then cures into a fixed shape, among which a choice may be made for the intended application.

When molded into a sheet of 1 mm thick, the electromagnetic wave-absorbing composition of the invention preferably has a breakdown voltage of at least 50 V, especially at least 100 V. A breakdown voltage of lower than 50 V has the increased risk of short-circuiting within electronic equipment, which may restrict the site where the composition is applicable, failing to achieve the requisite electromagnetic noise suppressing effects.

By virtue of the high breakdown voltage, the electromagnetic wave-absorbing composition of the invention can be applied to any adequate site within electronic equipment without a need to pay substantial attention to short-circuits on printed circuit boards and other devices. Such desired application of the composition ensures to suppress electromagnetic noise within electronic equipment more than ever, and to restrain the leakage of electromagnetic waves to the exterior. When the electromagnetic wave-absorbing composition of the invention endowed with a heat transfer ability is disposed between a device and a heat sink within electronic equipment, the composition ensures to suppress electromagnetic noise and to dissipate the heat generated in the device to the exterior of the equipment.

EXAMPLE

Examples of the invention are given below by way of illustration and not by way of limitation.

Example 1

An electromagnetic wave-absorbing composition within the scope of the invention was prepared. First, spherical particles of soft magnetic Fe—Cr—Si alloy (DEPS1 by Daido Steel Co., Ltd.) were coated with alumina fines as electrically insulating inorganic fines by an RF thermal plasma method, obtaining a magnetic powder coated with alumina fines. Analysis confirmed that a coating layer of alumina fines was formed to a buildup of 5% by weight based on the weight of the coated powder.

A liquid silicone rubber composition of the addition reaction type was prepared using a vinyl-containing dimethylpolysiloxane blocked at either end with a dimethylvinylsiloxy radical and having a viscosity of 30 Pa's at room temperature as the base oil. An organopolysiloxane containing silicon atom-bonded alkoxy radicals as the surface treating agent for fillers was added to the base oil in an amount of 1 part by weight per 100 parts by weight of the fillers combined. Then the alumina fine-coated magnetic powder and an alumina powder as the heat conductive filler were added to the base oil. The mixture was agitated and mixed at room temperature. With agitation and mixing continued, the mixture was heat treated at 120° C. for 1 hour, obtaining a base compound for the electromagnetic wave-absorbing composition.

Next, an organohydrogenpolysiloxane having at least two silicon atom-bonded hydrogen atoms in a molecule, a platinum group metal catalyst, and an acetylene alcohol reaction regulator were added to the base compound. The proportion of the respective components was adjusted such that the final composition contained 1,000 parts by weight of the alumina fine-coated magnetic powder and 400 parts by weight of the alumina powder as the heat conductive filler per 100 parts by weight of the silicone component. The composition was press molded and heat cured at 120° C. for 10 minutes to form a 1 mm (thick) sheet of the inventive electromagnetic wave-absorbing composition having both electromagnetic wave absorbing and heat transfer abilities.

Example 2

An electromagnetic wave-absorbing composition was molded into a sheet of 1 mm thick as in Example 1 except that the magnetic powder was coated with titanium oxide as the electrically insulating inorganic fines.

Example 3

An electromagnetic wave-absorbing composition was molded into a sheet of 1 mm thick as in Example 1 except that the magnetic powder was coated with aluminum nitride as the electrically insulating inorganic fines.

Example 4

An electromagnetic wave-absorbing composition within the scope of the invention was prepared. First, tabular particles of soft magnetic Fe—Si—Cr—Ni alloy (JEM powder by Mitsubishi Materials Corp.) were coated with alumina fines as electrically insulating inorganic fines by an RF thermal plasma method, obtaining a magnetic powder coated with alumina fines. Analysis confirmed that a coating layer of alumina fines was formed to a buildup of 6% by weight based on the weight of the coated powder.

Using a liquid silicone rubber composition of the addition reaction type as in Example 1, an electromagnetic wave-absorbing composition was prepared. The final composition contained 400 parts by weight of the alumina fine-coated magnetic powder per 100 parts by weight of the silicone component. A sheet of 1 mm thick was molded therefrom.

Example 5

An electromagnetic wave-absorbing composition was molded into a sheet of 1 mm thick as in Example 4 except that an acrylic rubber RV-2520 (Nisshin Chemical Co., Ltd.) was used as the base polymer.

Example 6

An electromagnetic wave-absorbing composition within the scope of the invention was prepared. First, spherical particles of soft magnetic Fe—Cr—Si alloy (DEPS1 by Daido Steel Co., Ltd.) were immersed in a dispersion of 15 wt % submicron alumina fines in toluene. The dispersion was intimately milled and then heated to evaporate off the toluene, yielding magnetic particles (powder) coated on surfaces with submicron alumina fines. Analysis confirmed that a coating layer of alumina fines was formed to a buildup of 7% by weight based on the weight of the coated powder.

Otherwise as in Example 1, an electromagnetic wave-absorbing composition was molded into a sheet of 1 mm thick.

Comparative Example 1

An electromagnetic wave-absorbing composition was molded into a sheet of 1 mm thick as in Example 1 except that spherical particles of soft magnetic Fe—Cr—Si alloy (DEPS1 by Daido Steel Co., Ltd.) were used without coating of electrically insulating fines.

Comparative Example 2

Spherical particles of soft magnetic Fe—Cr—Si alloy (DEPS1 by Daido Steel Co., Ltd.) were added to a dispersion of 5% by weight a long-chain alkyl-containing silane (KBM-3103 by Shin-Etsu Chemical Co., Ltd.) in hexane. The dispersion was agitated, mixed, and then heated to evaporate off the hexane, yielding magnetic particles (powder) coated on surfaces with KBM-3103. Analysis confirmed that a coating layer was formed to a buildup of 1.5% by weight based on the weight of the coated powder.

Otherwise as in Example 1, an electromagnetic wave-absorbing composition was molded into a sheet of 1 mm thick.

The sheets obtained in Examples 1 to 6 and Comparative Examples 1 to 2 were examined for breakdown voltage, attenuation of radiated electromagnetic waves (electromagnetic wave absorbing ability) and thermal conductivity by the following tests. The results are shown in Table 1.

Breakdown Voltage:
Measured according to JIS C-2110.
Attenuation of radiated electromagnetic waves (EM)

Figure 2:
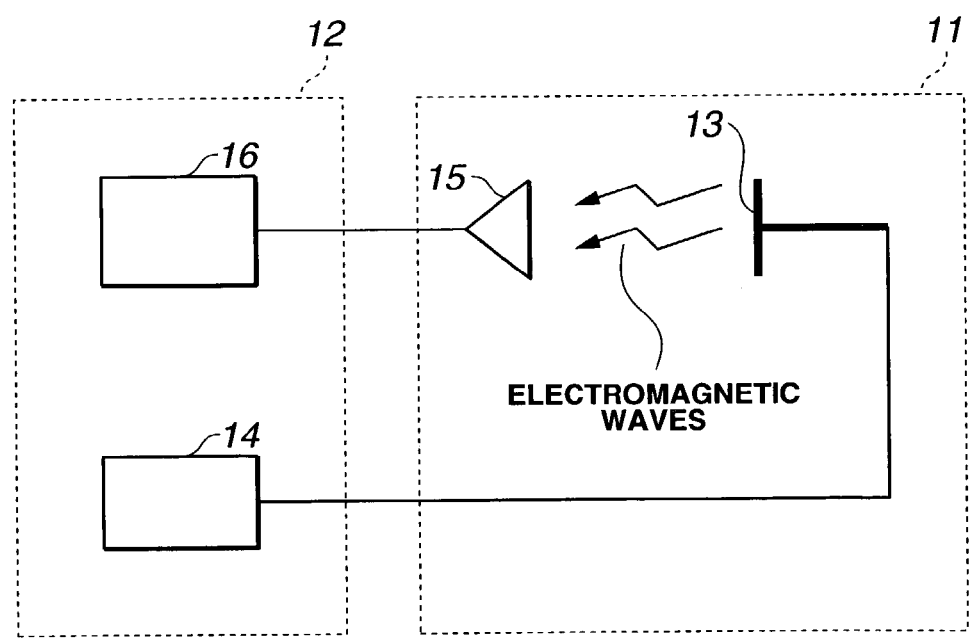
FIG. 2 schematically illustrates how to measure an attenuation of radiated electromagnetic waves.

The attenuation of radiated electromagnetic waves was determined using a system as shown in FIG. 2. Disposed in an electromagnetic dark chamber 11 is a dipole antenna 13 around which a sheet of 1 mm thick molded from an electromagnetic wave-absorbing composition is wrapped. A receiver antenna 15 is located in the chamber and spaced 3 m from the dipole antenna 13. This setting complies with the 3-in testing according to the Federal Communications Commission (FCC). Disposed in a shielded chamber 12 are a signal generator 14 which is connected to the dipole antenna 13 and an electromagnetic emission (EMI) receiver or spectral analyzer 16 which is connected to the receiver antenna 15. The signal generator 14 is operated to generate from the antenna 13 electromagnetic waves at a frequency of 1 GHz, which are received by the receiver antenna 15 and measured by the spectral analyzer 16. The difference between this measurement and the quantity of electromagnetic waves generated when the sheet is omitted is the attenuation.

Thermal Conductivity:
Measured according to ASTM E1530.

TABLE 1

| | Breakdown voltage (V) | Attenuation of radiated EM (dB) | Thermal conductivity (W/mK) |
|---|---|---|---|
| Example 1 | 1650 | 3.5 | 3.5 |
| Example 2 | 1720 | 3.4 | 3.3 |
| Example 3 | 1480 | 3.8 | 3.7 |
| Example 4 | 1020 | 8.5 | 1.0 |
| Example 5 | 1360 | 8.7 | 0.8 |
| Example 6 | 180 | 3.8 | 3.3 |
| Comparative Example 1 | 20 | 4.0 | 3.4 |
| Comparative Example 2 | 40 | 3.8 | 3.5 |

By virtue of a high breakdown voltage, the electromagnetic wave-absorbing composition of the invention can be applied to any adequate site within electronic equipment without a need to pay substantial attention to short-circuits on printed circuit boards and other devices. When the electromagnetic wave-absorbing composition endowed further with a heat transfer ability is disposed between a device and a heat sink within electronic equipment, the composition ensures to suppress electromagnetic noise and allows the heat generated in the device to dissipate to the exterior of the equipment. The use of the electromagnetic wave-absorbing composition within electronic equipment permits the countermeasures to electromagnetic noise and heat release to be taken at any desired site without caution and in a more effective and simple manner than before.

Japanese Patent Application No. 2002-149341 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An electromagnetic wave-absorbing composition comprising a curable organopolysiloxane as a base polymer and a magnetic powder coated with electrically insulating inorganic submicron fines in an RF thermal plasma method, dispersed therein, said composition having an Asker C hardness of up to 80 when cured.

2. The composition of claim 1 wherein the magnetic powder is of a magnetic metal material containing at least 15% by weight of iron.

3. The composition of claim 1 which exhibits a breakdown voltage of at least 50 V when molded into a sheet of 1 mm thick.

4. An electromagnetic wave-absorbing composition comprising a curable organopolysiloxane as a base polymer, and a magnetic powder coated with electrically insulating inorganic submicron fines in an RF thermal plasma method and a heat conductive powder, both dispersed therein, said composition having an Asker C hardness of up to 80 when cured.

5. The composition of claim 4 wherein the magnetic powder is of a magnetic metal material containing at least 15% by weight of iron.

6. The composition of claim 4 which exhibits a breakdown voltage of at least 50 V when molded into a sheet of 1 mm thick.

7. The composition of claim 4 wherein the base polymer is a curable organopolysiloxane.

8. The composition of claim 4 which has an Asker C hardness of up to 80 when cured.

9. A sheet obtained by molding and heat curing an electromagnetic wave-absorbing composition comprising a curable organopolysiloxane as a base polymer and a magnetic powder coated with electrically insulating inorganic submicron fines in an RF thermal plasma method, dispersed therein, said composition having an Asker C hardness of up to 80 when cured.

10. A sheet obtained by molding and heat curing an electromagnetic wave-absorbing composition comprising a curable organopolysiloxane as a base polymer, and a magnetic powder coated with electrically insulating inorganic submicron fines in an RF thermal plasma method and a heat conductive powder, both dispersed therein, said composition havening an Asker C hardness of up to 80 when cured.

11. The composition of claim 1 or 4 wherein the composition when cured has a thermal conductivity of at least 1.0 W/mk.

12. A sheet of claim 9 or 10 wherein the composition when cured has a thermal conductivity of at least 1.0 W/mk.

13. The composition of claim 1 or 4 wherein the curable organopolysiloxane has at least two alkenyl radicals per molecule and has the average compositional formula (1)

$$R^1_a SiO_{(4-a)/2} \tag{1}$$

wherein, $R^1$, which may be the same or different, stands for substituted or unsubstituted monovalent hydrocarbon radicals having 1 to 10 carbon atoms, and the subscript "a" is a positive number from 1.98 to 2.02, and the composition further comprises a combination of an organohydrogenpolysiloxane and an addition reaction catalyst or an organic peroxide so that a silicone rubber or silicone gel having an Asker C hardness of up to 80 is obtained when cured.

14. The sheet of claim 9 or 10 wherein the curable organopolysiloxane has at least two alkenyl radicals per molecule and has the average compositional formula (1)

$$R^1_a SiO_{(4-a)/2} \tag{1}$$

wherein, $R^1$, which may be the same or different, stands for substituted or unsubstituted monovalent hydrocarbon radicals having 1 to 10 carbon atoms, and the subscript "a" is a positive number from 1.98 to 2.02, and the composition further comprises a combination of an organohydrogenpolysiloxane and an addition reaction catalyst or an organic peroxide so that a silicone rubber or silicone gel having an Asker C hardness of up to 80 is obtained when cured.

* * * * *